Dec. 13, 1960  D. M. SUTHERLAND ET AL  2,964,661
EDDY CURRENT BRAKE SYSTEM FOR A REACTOR ROD
Filed Oct. 1, 1957  8 Sheets-Sheet 1

United States Patent Office 2,964,661
Patented Dec. 13, 1960

2,964,661

EDDY CURRENT BRAKE SYSTEM FOR A REACTOR ROD

Donald Mason Sutherland, Urmston, Harold Proctor, Heaton Moor, Stockport, John Kenneth Jobbins, Sale, and James Leslie Kearney, Allerton, Liverpool, England, assignors to Metropolitan-Vickers Electrical Co. Ltd., London, England, and United Kingdom Atomic Energy Authority, London, England Filed Oct. 1, 1957, Ser. No. 687,629

Claims priority, application Great Britain October 1, 1956

5 Claims. (Cl. 310—93)

This invention relates to mechanisms for controlling the operation of nuclear reactors and it is concerned with that part of the mechanism providing rapid shut-down of the reactor under emergency conditions.

In the emergency shut-down of a nuclear reactor a neutron absorbing mass may be driven into the reactor core or alternatively a neutron generating mass may be driven from the reactor core. In both operations there is a problem of moving a mass as quickly as possible over most of its defined range of travel with infallibility and then arresting that mass in the remainder of its range of travel without creating undue stresses or causing damage such that a maintenance operation is required to restore the reactor to service. The present invention provides a mechanism suited to meet this problem by first arranging for substantially unhindered movement of a coupling shaft and then arranging for progressive eddy current braking of the shaft.

The mechanism of the invention comprises an eddy current brake having a shaft connected with an eddy current rotor movable in a magnetic field characterised in having means varying the intensity of the magnetic field according to the extent of rotation of said shaft.

A preferred form of mechanism according to the invention will now be described with reference to the accompanying drawing wherein.

Figure 1:
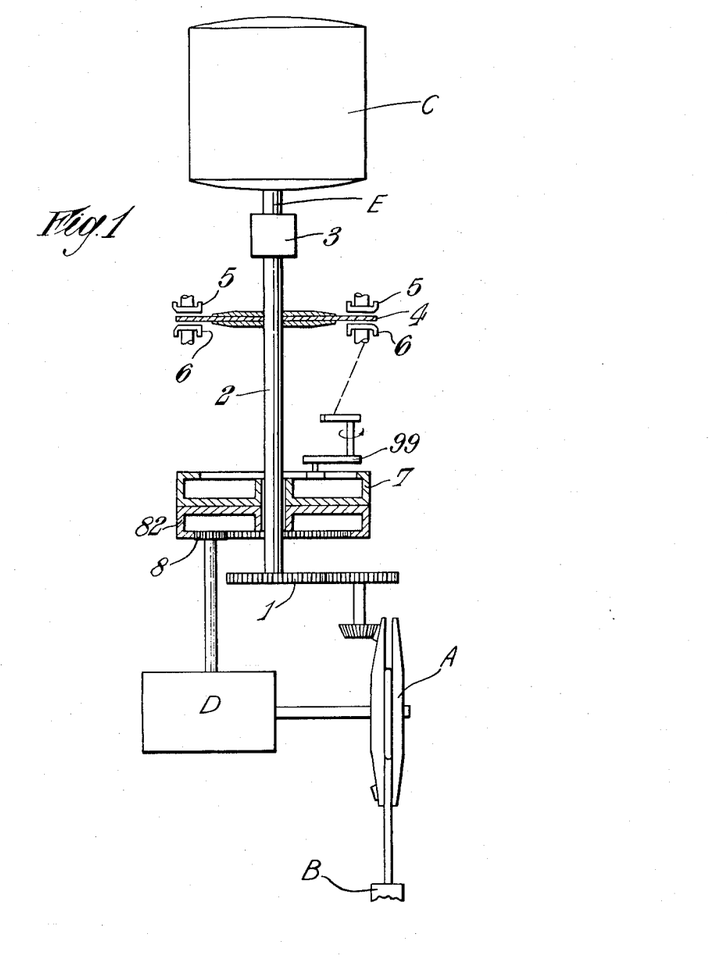
Fig. 1 is a schematic diagram.

By way of general introduction to the mechanism and reference to Fig. 1 a gear wheel 7 on a coupling shaft 2 is provided to drive a winch A from which is suspended a boron steel combined control and shut off rod B. The shaft 2 which is arranged to be driven by an electric motor C through a splined shaft E and a coupling clutch 3 (shown in detail in Fig. 3) carries a rotor 4 movable in a magnetic circuit including pole pieces 5 and 6. The field set up by the magnetic circuit cuts the rotor 4 and is made variable by movement of a cam follower arm 99 under the control of a cam ring 7 driven by a spur gear wheel 8 coupled back from the winch A via a gear train D.

Figure 2:
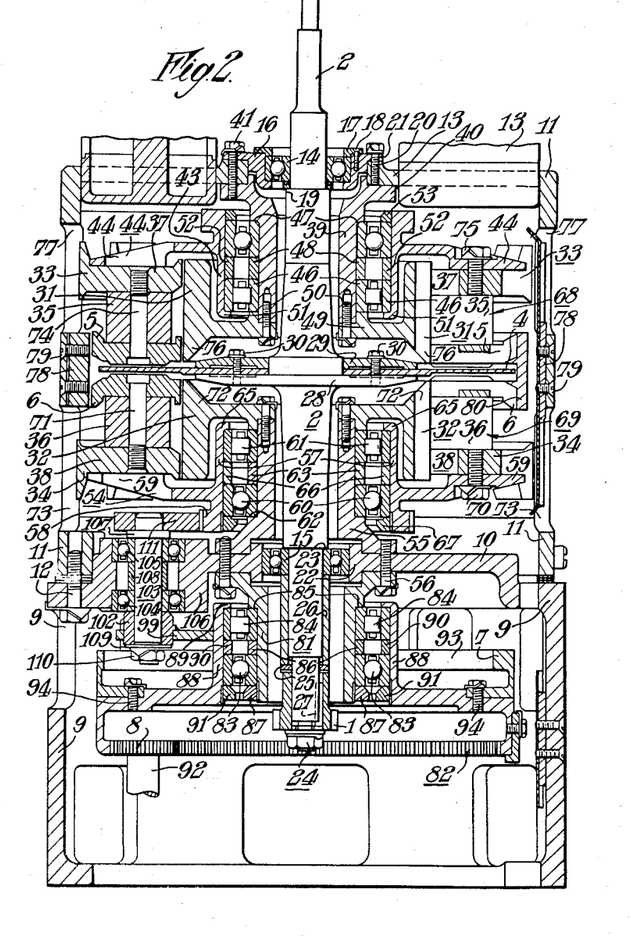
Fig. 2 is a sectional elevation.

Now referring to Fig. 2 and directing attention to the housing and support of the coupling shaft 2. A cylindrical gear housing 9 closed at one end by an integral bearing support plate 10 is bolted to a main cylindrical housing 11 by bolts 12. The main housing 11 has an integral end plate 13. The coupling shaft 2 is carried within the main housing 11 by ball races 14 and 15. The ball race 14 is held in a flanged cup 16 by a ring 17 and bolts 18 and rests against a shoulder 19 in the shaft 2. The cup 16 is secured to the end plate 13 by bolts 20 passing through the flange 21 of the cup 16. The ball race 15 is mounted in a boss 22 of the bearing support plate 10 and bears against a shoulder 23 of the shaft 2 under the load of a nut and washer 24 acting through the gear wheel 1, spacer washer and shim 25 and spacer sleeve 26. The gear wheel 1 is keyed to the shaft 2 by a key 27. A copper rotor disc 4 is carried by the shaft 2 clamped to an integral flange 28 by an annular plate 29 and bolts 30.

Figure 4:
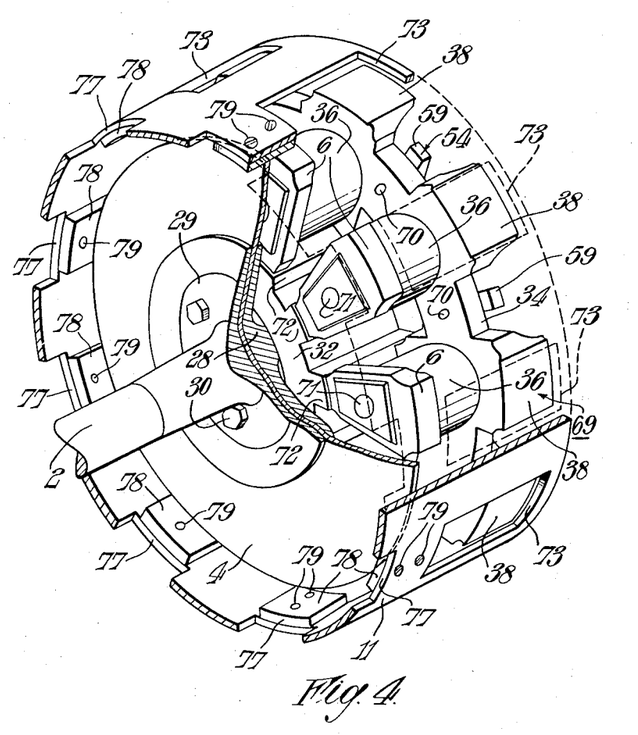
Figs. 4, 5 and 7 are partly cut-away perspective views of part of the mechanisms of Fig. 2.
Figure 5:
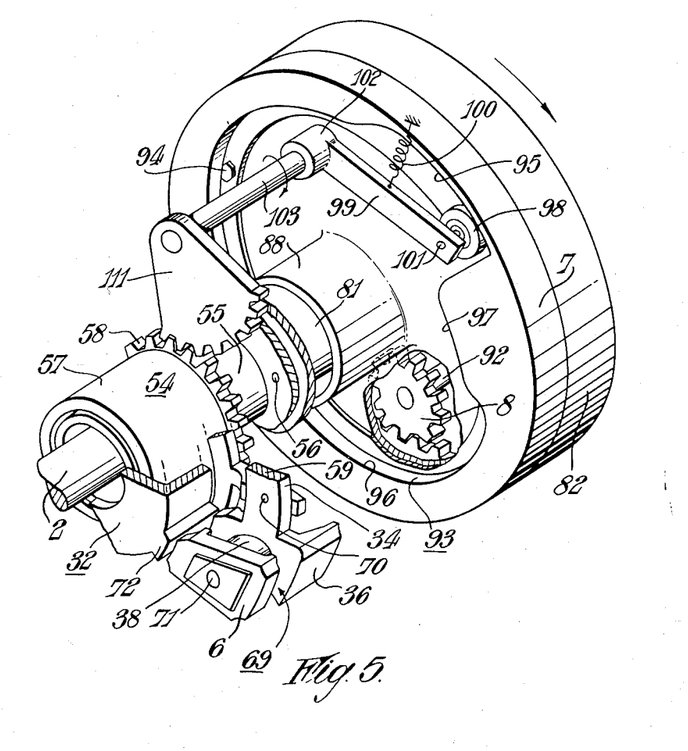
Figure 7:
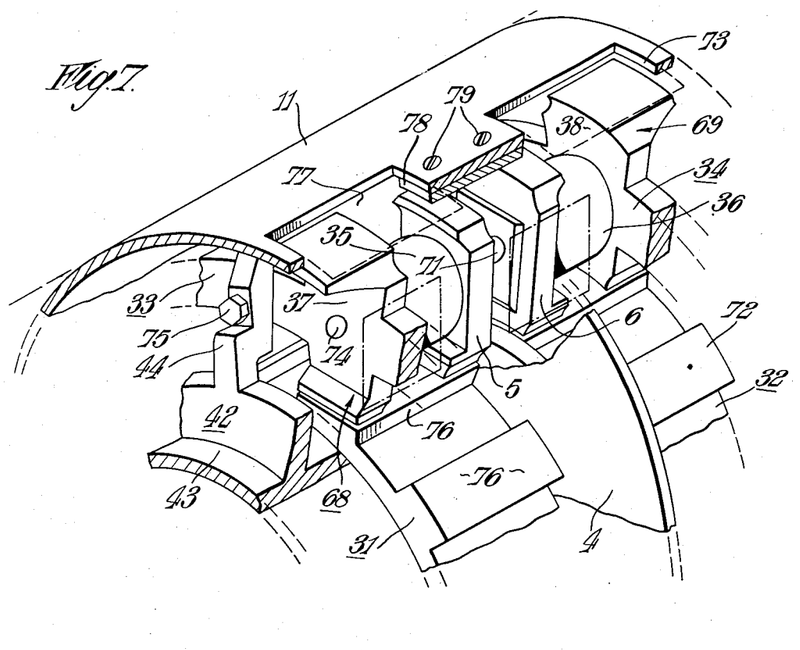

Now directing attention to Fig. 2 in particular and to Figs. 4, 5 and 7 there is a magnetic circuit producing a flux to be cut by the rotor disc 4. The magnetic circuit has two main parts, a static part comprising the main housing 11 and two toothed rings 31 and 32, and a movable part comprising two rings 33 and 34 with integral pole pieces 37 and 38 respectively. The pole pieces 37 of the ring 33 carry permanent magnets 35 and separate pole pieces 5 while the pole pieces 38 of the ring 34 carry permanent magnets 36 and separate pole pieces 6 (Figs. 4 and 7). There is one ring (33 or 34) on each side of the rotor disc 4. Referring to the magnetic circuit in detail, a bearing sleeve 39 is bolted by means of an integral flange 40 and bolts 41 to the centre of the end plate 13. A spider 42 comprising a sleeve like centre bush 43 with nine equally spaced radial legs 44 is rotatably mounted on the bearing sleeve 39 by a ball race 45 and a roller race 46. The ball race 45 is held against a shoulder 47 of the bearing sleeve 39 by a spacer sleever 48. The roller race 46 holds the spacer sleeve 48 and is itself held by an internal flange 49 of an L section toothed ring 31 bolted to the open end of the bearing sleeve 39 by bolts 50. The roller race 46 is held on the centre bush 43 of the spider 42 against an internal end flange 51 by an internal spacer sleeve 52. The ball race 45 is held in the centre bush 43 against the spacer sleeve 52 by an internal ring nut 53. A second spider 54 is rotatably mounted on a bearing sleeve 55 which is bolted on the bearing support plate 10 by bolts 56. The spider 54 has a centre bush 57 with an integral external gear 58 and nine equally spaced radial legs 59 and is mounted on the bearing sleeve 55 by means of a ball race 60 and roller race 61. The races 60 and 61 are similarly mounted to the races 45 and 46 of the first spider 42 i.e. the roller race 61 is held on the bearing sleeve 55 against a shoulder 62 by a spacer sleeve 63, the ball race 60 bears against the spacer sleeve 63 and is retained by an L-sectioned toothed ring 32 (similar to the ring 31). The roller race 61 is contained within the centre bush 57 of the spider 54 bearing an internal end flange 65 and held by a tubular spacer 66. The ball race 60 is also held within the centre bush 57 of the spider 54 bearing against the tubular spacer 66 and retained by a ring nut 67. Magnetic systems 68 and 69 are carried by the spiders 42 and 54 respectively. The magnetic system 69 is shown in detail in Fig. 4. In Fig. 4 the spider 54 is shown. The ring 34 having nine integral pole pieces 38 is attached to the spider 54 at each of the legs 59 by bolts 70. Each of the integral pole pieces 38 has bolted to it a separate pole piece 6 and a cylindrical magnet 36 by a bolt 71. The L section toothed ring 32 is associated with the magnetic system 69 and has nine teeth 72. The main housing 11 has nine apertures 73 associated with the magnetic system 69. The magnetic system 68 is mounted on the spider 42 in a similar manner to the magnetic system 69. Referring to Fig. 7 which shows part of the system 68. A ring 33 with nine integral pole pieces 37 each having a separate pole piece 5 and a cylindrical magnet 35 bolted to it by means of bolts 74 is attached to the spider 42 by bolts 75. The L section toothed ring 31 is associated with the magnetic system 68 and has nine teeth 76. The main housing 11 has nine apertures 77 associated with the magnetic system 68. The magnetic system 68 is situated such that each of its separate pole pieces 5 is opposite to a pole piece 6 of the magnetic system 69 with the copper rotor disc 4 running between (as shown in Fig. 7). Keeper pieces 78 span between the outer faces of the pole pieces 5 and 6 and are attached to the main housing 11 by bolts 79. The two magnetic systems 68 and 69 are rigidly connected to each other by a bridge piece 80 (Fig. 2) connecting one of the pole pieces 5 to its opposite pole piece 6.

Figures 6, 10:
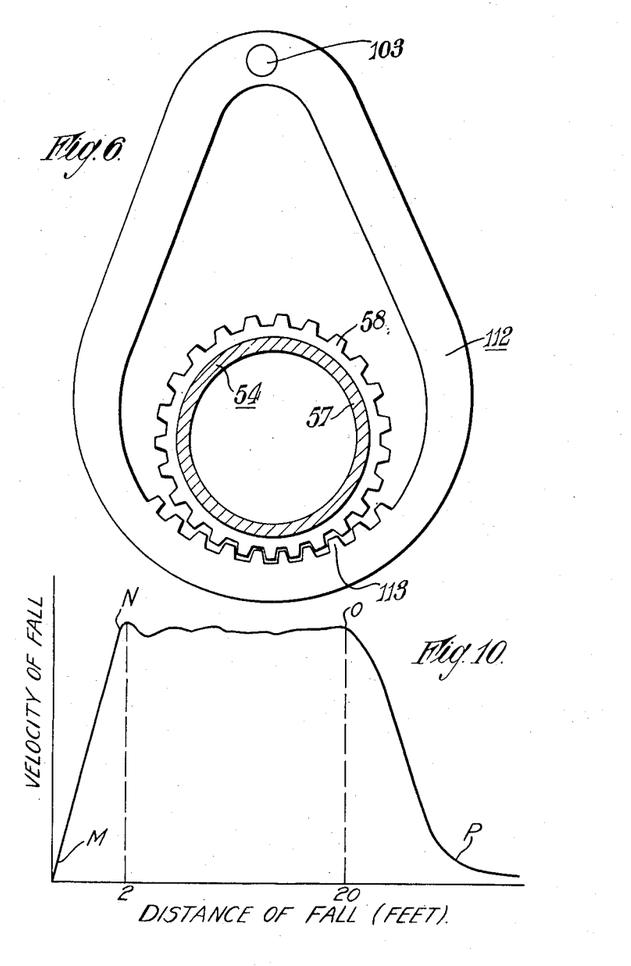
Fig. 6 shows an alternative gear arrangement to that shown in Fig. 5.
Fig. 10 is a graph.

Referring to Figs. 2 and 5, which illustrate the cam operating mechanism. A flanged sleeve 81 is bolted to the bearing support plate 10 on the opposite side to the sleeve 55 by the bolts 56. The sleeve 81 carries an internal gear 82 which is mounted on the sleeve 81 by a ball race 83 and a roller race 84. The roller race 84 is held on the sleeve 81 against a shoulder 85 of the sleeve 81 by a spacer sleeve 86. The ball race 83 bears against the sleeve 86 and is retained by a ring nut 87 screwed onto the open end of the sleeve 81. The internal gear 82 has a centre sleeve-like bush 88 with an internal flange 89 and the roller race 84 is held inside the centre 88 against the flange 89 by a tubular spacer 90. The ball race 83 is also held inside the centre bush 88 against the spacer 90 by a ring nut 91 which screws into the end of the centre bush 88. A cam ring 7 with an internal cam face 93 is bolted to the internal gear 82 by bolts 94. Referring to Fig. 5 the cam face 93 is stepped in three sections 95, 96 and 97. The internal gear 82 and the associated ring 7 with its cam face 93 is driven by a spur gear 8 mounted on a shaft 92. A ball race 98 carried by a cam follower arm 99 is loaded by a spring 100 to roll on the cam face 93. The ball race 98 is carried by a spindle 101, fixed at one end of the cam follower arm 99 which also has a bush 102 at its other end. Referring to Fig. 2 the cam follower arm 99 is mounted on a spindle 103 by means of the bush 102. The spindle 103 is carried in two ball races 104 and 105 (Fig. 2) mounted in a bearing bush 106 formed integral with the bearing support plate 10. The spindle 103 has an external flange 107 against which the ball race 104 is held by a spacer sleeve 108. The lever arm 99 is mounted on the spindle 103 by means of the bush 102 and is retained by a washer 109 and a nut 110. The ball race 105 bears against the spacer sleeve 108 and is held by the bush 102 of the lever arm 99. Referring to Fig. 2 and to Fig. 5 a quadrant gear 111 welded to the spindle 103 engages with the external gear 58 of the spider 54 which carries the magnetic system 69. In the modification of Fig. 6 the quadrant gear 111 is replaced by a member 112 of the shape illustrated. This member 112 has external gear teeth 113 which engage with the teeth of the external gear 58. In the arrangement of Fig. 6 the ratio of the system is increased.

Figure 3:
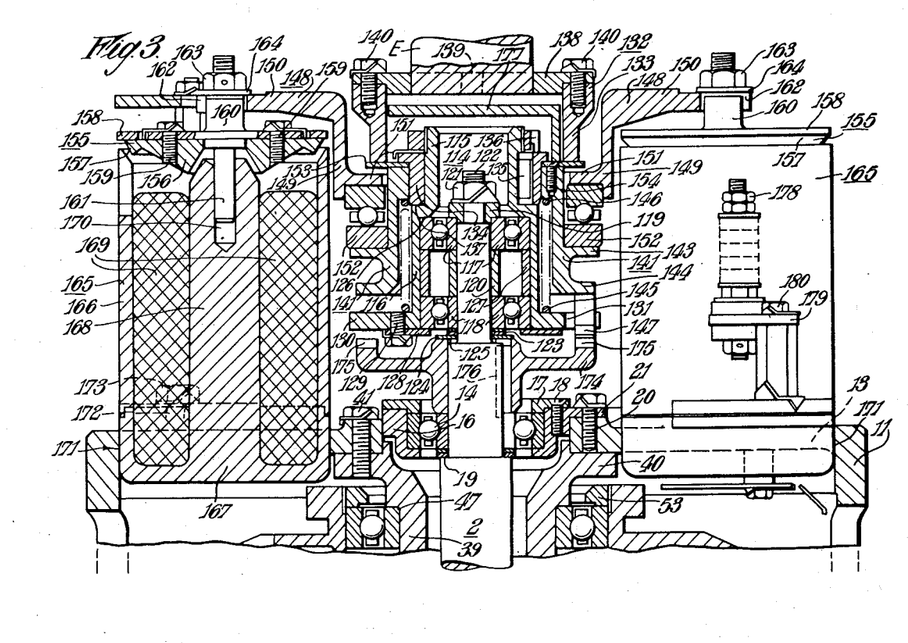
Fig. 3 is a part-sectional elevation of a magnetic coupling for use in conjunction with the mechanism of Fig. 1.

Referring now to the magnetic clutch arrangement shown in Fig. 3. The clutch has a tubular driving member 114 stepped in two tubular parts 115 and 116. The member 114 is carried on the shaft 2 by the two ball ball races 117 and 118 which are located in the tubular part 116. The ball race 117 is held on the shaft 2 between an end ring 119 and one end of a spacer sleeve 120. The end ring 119 is retained by a nut 121 on the end 122 of the shaft 2. The ball race 118 is located on the shaft 2 between the other end of the spacer sleeve 120 and a shim 123 held by a washer 124 which bears against a shoulder 125 in the shaft 2. The ball race 117 is held inside the tubular part 116 of the driving member 114 against an internal shoulder 126 by a tubular spacer 127. The ball race 118 is held by the spacer 127 and an end ring 128 bolted to the end of the driving member 114 by bolts 129. The tubular part 116 of the driving member 114 also has an external flange 130 with three rectangular circumferential slots 131 set at 120 degree intervals around its outer edge. A drive housing 132 having two tubular parts 133 and 134 is carried by the driving member 114. The drive housing 132 is held on the member 114 with its part 113 held and keyed onto the part 115 of the driving member 114 by a key 135. A ring nut 136 on the driving member 114 holds the drive housing 132 against an external shoulder 137 of the driving member 114. A clutch coupling ring 138 with internal keyways 139 is bolted to the drive housing 132 by bolts 140. A tubular clutch engaging member 141 having a stepped bore 142, an external flange 143 and an external end flange 144 is slidably mounted on the part 133 of the drive housing 132. A compression spring 145 acts between an internal step 146 in the bore 142 of the clutch member 141 and the flange 130 of the driving member 114. The end flange 144 of the clutch member 141 has three pointed teeth 147 set at 120 degree intervals around its outer edge. The teeth 147 project from the flange 144 and extend through the slots 131 in the flange 130 of the driving member 114.

A grooved plate 174 with nine V shaped grooves 175 is keyed to the shaft 2 by a key 176. A clutch spider 148 having a tubular centre part 149 with six equally spaced radial legs 150 and an internal flange 151 is carried on the tubular clutch member 141 by a thrust bearing 152. The thrust bearing 152 operates between the external flange 143 of the clutch member 141 and the internal flange 151 of the spider 148. An end plate 153 bolted to the end of the clutch member 141 by bolts 154 retains the spider 148. Each radial leg 150 of the spider 148 carries an armature 155 comprising an armature ring 156 with an outer conical edge 157 mounted on a circular plate 158 by bolts 159. The circular plate 158 has a central threaded stud 160 on one face and a central plunger 161 projecting from its other face. The stud 160 of each of the armatures 155 is held within an end slot 162 in each of the radial leg 150 and is retained by a nut 163 and washer 164. Six electromagnetic solenoids 165 comprising a tubular body 166, a base cup 167 having a projecting central cylindrical core piece 168 carrying a solenoid winding 169 are mounted on the end plate 13 of the main housing 11 such that the plunger 161 of the armatures 155 are held in complementary holes 170, in the ends of each of the cores 168. The solenoids 165 are mounted in holes 171 in the end plate 13 and are each attached to the end plate 13 by a pair of flanges 172 integral with the body part 166 of the solenoid 165 and bolts 173. An actuator plate 177 is bolted to the clutch member 141 and is held inside the tubular part 133 of the drive housing 132. Six terminals 178 grouped in three pairs are located on terminal plates 179 bolted to the main housing 11 by bolts 180. Each pair of terminals 178 are connected to two of the solenoid windings 169 connected in parallel. Each of the pairs of terminals 178 are connected to one phase of a three phase supply through a switching device (not shown).

The use of the eddy current brake will now be described with reference to the deceleration to rest of a freely falling control rod B as shown in Fig. 1.

Referring to Fig. 3, the motor C is coupled to the clutch coupling ring 138 of the electromagnetic clutch 3 by the splined shaft E. Normal drive is transmitted to the shaft 2 and hence to the winch A only when the solenoids 165 of the electromagnetic clutch shown in Fig. 3 are energised, i.e. on energisation of the solenoids 165 the armatures 155 carried by the clutch spider 148 is transmitted by the spider 148 to the clutch member 141 which slides on the drive housing 132 against the loading of the compression spring 145. The movement of the clutch member 141 brings its three teeth 147 into engagement with three of the V-shaped grooves 175 of the grooved plate 174 which is keyed to the shaft 2. The drive of the motor C (Fig. 1) is transmitted to the clutch member 141 through the clutch housing 132 and the driving member 114 which drives the clutch member 141 by engagement of the teeth 175 in the slots 131 in the flange 130 of the driving member 114. Thus when the clutch engaging member 141 is engaged with the grooved plate 174 on energisation of the solenoids 165 the drive of the motor C is transmitted to the shaft 2. When the drive motor C is shut off control rod B (Fig. 1) suspended from a cable carried on the winch A (Fig. 1) will be held in suspension if the clutch 3 is held in the engaged position. However if the solenoids 165 are de-energised to disengage the clutch 3 the control rod B is free to fall and in so doing drives the shaft 2 and the rotor disc 4 which it carries. The internal gear 82 carrying the cam ring 7 is driven by the spur gear 8 mounted on the shaft 92 which is coupled to be driven by the winch A through the gear train D. Thus the position of the cam ring 7 is directly related to the position of the winch A and hence to the position of the suspended load. Referring to Fig. 5, the cam follower arm 99 is held with the ball race 98 bearing against the cam face 93 and if the suspended control rod is allowed to fall the consequent rotation of the winch A is transmitted to the cam ring 7 through the internal gear 82 thus the cam follower arm 99 is rotated as the ball race 98 rides along the cam face 93. The rotation of the cam follower arm 99 is transmitted via the spindle 103 and the quadrant gear 111 to rotate the spider 54 which carries the magnetic system 69. As the suspended load falls the magnetic system 69 and the magnetic system 68 which is mechanically coupled to the system 69 by the bridge piece 80 (Fig. 2) are rotated relatively to the main housing 11 and to their respective L section toothed rings 32 and 31. When the control rod is in the fully raised position the ball race 98 carried by the cam follower arm 99 is arranged to be held against the section 95 of the cam face 93 (as shown in Fig. 5). When the cam ring 7 is in this position the magnetic systems 68 and 69 are located in a position as illustrated in Fig. 7. In Fig. 7 of the system 68 there is shown an integral pole piece 37 of the ring 33 with its associated magnet 35 and separate pole piece 5 and of the system 69 there is shown an integral pole piece 38 of the ring 34 with its associated magnet 36 and separate pole piece 6. In this position the magnetic system 68 is situated such that the teeth 76 of the L-section toothed ring 31 each span between the inner faces of the pairs of pole pieces 5 and 37 and such that the outer face of each integral pole piece 37 is opposite an aperture 77 in the main housing 11. The magnetic system 69 is situated such that the teeth 72 of the L-section toothed ring 32 span between the inner faces of the pairs of pole pieces 6 and 38 and such that the outer face of each integral pole piece 38 is opposite an aperture 73 in the main housing 11. When the magnetic systems are in this position the magnetic field path is as shown by the chain dotted lines in Fig. 7. The magnetic field path is also shown by chain dotted lines in Fig. 8. Referring again to Fig. 5 as the suspended control rod continues to fall the ball race 98 runs along the section 95 of the cam face 93 until it rides onto the section 96 and eventually onto the section 97 with consequent rotation of the cam follower arm 99. This rotation of the lever arm 99 is translated into rotation of the magnetic systems 68 and 69 and when the ball race 98 is on the section 97 of the cam face 93 the magnetic systems 68 and 69 are in a position with the inner faces of the pairs of pole pieces 5 and 37 of the system 68 opposite the gaps between the teeth 76 of the L-sectioned toothed ring 31, and with the outer face of the integral pole pieces 37 adjacent to the wall of the main housing 11 between the apertures 77, similarly the inner faces of the pairs of pole pieces 6 and 38 of the magnetic system 69 are situated opposite to the gaps between the teeth 72 of the L-section toothed ring 32 and the outer faces of the integral pole pieces 38 are adjacent to the wall of the main housing 11 between the apertures 73. When the magnetic systems are in the latter position the field path is as shown by the chain dotted lines in Fig. 9. As the ball 98 runs on the intermediate section 96 of the cam face 93 the magnetic systems 68 and 69 are in a position half way between the extreme positions just described.

Figure 8:
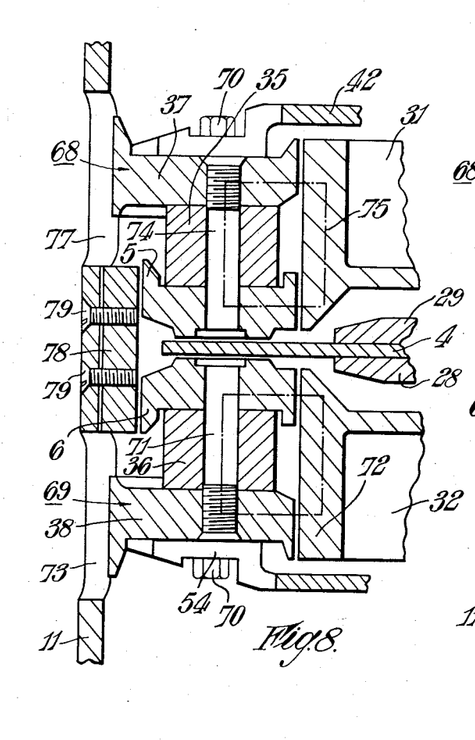
Figs. 8 and 9 are sectional elevations illustrating magnetic operating conditions.
Figure 9:
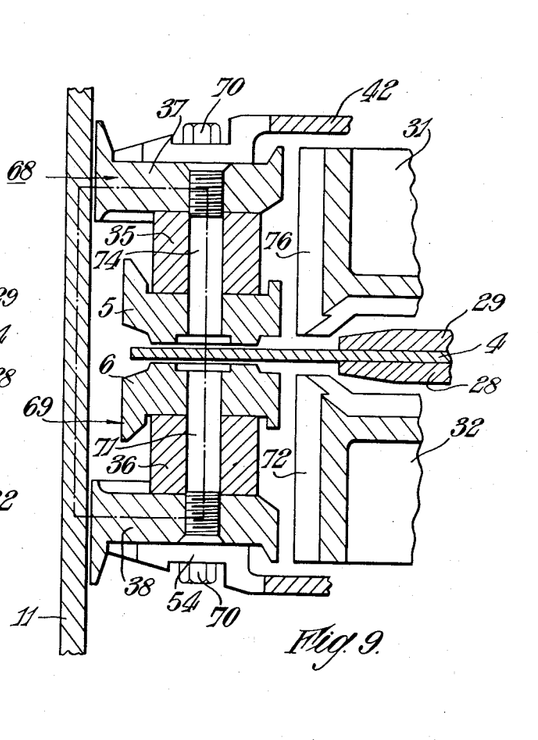

Thus as the suspended control rod starts to fall the magnetic systems are in the position such that their field paths are as indicated by the chain dotted lines in Figs. 7 and 8; in this position the field path in each system is a closed loop and does not pass through the copper rotor disc 4 which is rotating between the two systems 68 and 69. After the suspended control rod has fallen about two feet the ball race 98 of the lever arm 99 rides up onto the section 96 of the cam face 93 and the magnetic systems 68 and 69 are rotated so that they are positioned half way between the two extreme positions illustrated in Figs. 8 and 9 respectively. In this position the field path of the magnetic systems 68 and 69 is partially that as shown in Fig. 8 and partially that as shown in Fig. 9. In Fig. 9 the field path is a closed loop which passes through the rotor disc 4. Thus when the magnetic systems 68 and 69 are in the intermediate position that part of the field path passing through the rotor disc 4 provides an eddy current braking effect on the rotor which retards the fall of the suspended control rod and constrains it to fall at a constant velocity for about 18 feet. Eventually the ball race 98 rides up onto the section 97 of the cam face 93 and the magnetic systems are in the position as shown in Fig. 9 with the field path wholly in the form of a closed loop passing through the rotor disc 4. The full eddy current braking effect is thus applied to the rotor disc 4 and the suspended control rod is decelerated to a velocity from which it can be easily brought to rest.

Fig. 10 is a graph illustrating the variation of velocity of the control rod with its position. The section MN of the graph corresponds to the initial accelerating fall of the control rod for about two feet while the ball race 98 is running on the section 95 of the cam face 93. The section NO of the graph corresponds to the fall for 18 feet under constant velocity partially braked conditions while the ball race 98 is running on the section 96 of the cam face 93. The section OP of the graph corresponds to the final deceleration under full braking conditions while the ball race 98 is running on the section 97 of the cam face 93. It will be appreciated that the braking effect is also dependent on the speed of rotation of the rotor disc 4 and therefore there will be a slight retarding effect when the control rod is being driven up from its lowest position. However, as the rate of lifting is small, the angular velocity of the rotor 4 will be small and hence the braking effect will be negligible. It may be required to raise the control rod by hand using a winding handle by-passing the driving motor C. The clutch 3 is engaged by depressing the actuator plate 177 by means of a probe and the control rod can then be raised.

The combination of variable eddy current braking in conjunction with a winch A which provides for a flat spiral lay of control rod cable is particularly attractive as the rotational speed of the eddy current rotor relative to the linear movement of the control rod B increases as the control rod B reaches the end of its travel when increased braking effect is required.

We claim:

1. A mechanism comprising an eddy current brake, opposed pole magnets of said eddy current brake, a shaft-mounted rotor for rotation between said magnets, magnetic flux shunting means, means providing relative movement between said shunting means and said magnets for causing magnetic flux to traverse said rotor in one limiting relative position, to avoid said rotor in another limiting relative position, and partially to traverse said rotor in intermediate relative positions, and means for controlling the relative positions of said shunting means and said magnets according to the extent of rotation of said shaft.

2. A mechanism as claimed in claim 1, wherein said magnets and said magnetic flux shunting means are arranged to be movable relative to one another about a common axis which is also the axis of said rotor.

3. A mechanism as claimed in claim 2 wherein said magnets are arranged in pairs around the periphery of the rotor, said flux shunting means is in the form of a cylinder around and concentric with the rotor with sectors removed corresponding with each magnet pair in combination with a member having teeth corresponding with each magnet wherein in one limiting relative position the solid parts of the cylinder between the sectors and the gaps between the teeth of said member are adjacent to the magnets for providing a single magnetic path favourable to the magnetic flux of the magnet pairs traversing the rotor and through said solid parts of the cylinder, and in another limiting relative position said sectors and said teeth are adjacent to the magnets for providing a magnetic path favourable to the flux of the magnets avoiding the rotor.

4. A mechanism as claimed in claim 1 wherein said shaft is coupled with a cable winding drum carrying cable wound in the form of a flat spiral so that the ratio of the angular velocity of the eddy current rotor to the linear velocity of the cable increases as the cable pays off the drum.

5. A mechanism as claimed in claim 4 wherein said means providing relative movement between said shunting means and said magnets according to the extent of rotation of the shaft comprises a cam follower operating in conjunction with a cam moved by said shaft and profiled for varying the intensity of the magnetic flux traversing said rotor so that first the cable is paid off from the cable winding drum with high acceleration, secondly the cable is decelerated to a constant velocity and finally the cable is decelerated to a low velocity.

References Cited in the file of this patent

UNITED STATES PATENTS

| | | |
|---|---|---|
| 1,477,490 | Hough | Dec. 11, 1923 |
| 2,317,290 | McIlvried | Apr. 20, 1943 |
| 2,365,691 | Fodor | Dec. 26, 1944 |
| 2,409,866 | Jewell | Oct. 22, 1946 |
| 2,591,463 | Parker | Apr. 1, 1952 |
| 2,636,138 | Few | Apr. 21, 1953 |